Aug. 8, 1967    B. O. PRAY ETAL    3,335,111
CONTINUOUS POLYMERIZATION OF POLYCARBONATES AND REMOVAL
OF LOW-BOILING BY-PRODUCTS THEREFROM
Filed July 30, 1962

INVENTORS
BLAINE O. PRAY
HOWARD R. OHME
BY
Oscar H. Spencer
ATTORNEY

United States Patent Office 3,335,111
Patented Aug. 8, 1967

3,335,111
CONTINUOUS POLYMERIZATION OF POLYCARBONATES AND REMOVAL OF LOW-BOILING BY-PRODUCTS THEREFROM
Blaine O. Pray, Wadsworth, and Howard R. Ohme, Akron, Ohio, assignors to Pittsburgh Plate Glass Company, Pittsburgh, Pa., a corporation of Pennsylvania
Filed July 30, 1962, Ser. No. 213,177
3 Claims. (Cl. 260—47)

ABSTRACT OF THE DISCLOSURE

The invention is of a method for the continuous polymerization of a polycarbonate by introducing the reactants, a dihydroxy aromatic organic compound and a monomeric biscarbonate ester of a dihydroxy compound, into the first of at least two sequentially disposed zones each of which is isolated from the other. The reactants are maintained at a temperature of from 200° C. to 325° C. and at a pressure of from 100 millimeters of mercury to atmospheric pressure or higher to form a molten reaction mass and to suppress volatilization of low-boiling by-products. Force is then applied to the molten mass to move it from the reaction zone to the second, next isolated zone and to each succeeding zone. The pressure is maintained at below 100 millimeters in the second zone to volatilize low-boiling by-products which are then withdrawn from the mass. The pressure is maintained in the third zone at less than 10 millimeters of mercury to volatilize further amounts of low boiling compounds which are also withdrawn. An extrudable mass of molten polycarbonate is then continuously recovered.

---

This invention relates to the manufacture of high molecular weight polycarbonates, notably those derived from 2,2-(4,4'-dihydroxydiaryl)alkanes. It especially relates to polycarbonates prepared from lower molecular weight carbonate esters in continuous manner.

Considerable art relative to the preparation of polycarbonate resins is found in the literature. In such art, various polycarbonate resins are disclosed wherein dihydroxy compounds of several different types may be reacted with phosgene or a bischloroformate of a dihydroxy compound to form polycarbonate resin. The reaction is quite general and hence can be used to prepare polycarbonates having widely differing physical properties. Other procedures are based on interchange type of reactions, for example, 1,3-phenylene-bis(phenyl carbonate) is reacted with hydroquinone and 1,6-hexanediol in the presence of lithium hydride. Typical patents disclosing such procedures are Belgian Patent 532,543, U.S. Patent 2,997,459, and U.S. Patent 2,999,835. Most methods of preparation, however, are based upon reactions which employ solution techniques and consequently organic solvents.

Polycarbonate resins prepared by ester interchange type of reactions are necessarily carried out in an excess of one reactant which serves as a solvent or in a solution within an inert solvent. It is usually necessary to heat the reaction mixture to the refluxing temperature and maintain such a temperature for an extended period of time. Attempts to carry out such a reaction in the absence of a solvent results in difficulty caused by the viscosity of the high molecular weight products formed.

Now it has been discovered that polycarbonate resins may be prepared without resorting to the use of expensive, toxic or flammable solvents. By practice of the instant invention, it also has been found possible to eliminate much of the processing usually required in the preparation of polycarbonate resins by other procedures. Thus, a high order of simplicity is achieved by use of the invention of the present disclosure. These and other advantages will become apparent hereinafter.

In accordance with this invention polycarbonate resins are prepared by a continuous process which comprises passing a mixture of reactants through a reaction zone to subject such mixture throughout a period of from 5 to 30 minutes to a temperature of from 200 to 325° C., usually 280 to 325° C., while reducing the pressure to from 0.1 to 50, preferably below 10, millimeters of mercury pressure to remove volatile by-products and thereafter extrude molten polycarbonate resin.

The mixture of reactants generally comprises catalyst, carbonate ester, notably biscarbonate ester, and a dihydroxy compound. Carbonate ester results from the union of carbonate groups,

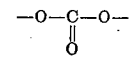

with residues of aliphatic, aromatic, or cycloaliphatic hydroxy compounds to form a compound having the structure,

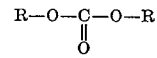

wherein R is a residue of a monofunctional aliphatic, aromatic, or cycloaliphatic hydroxy compound. R may also be a residue of mixed type. A special type of carbonate ester may be obtained by the union of carbonate groups with both monofunctional and difunctional residues of aliphatic, aromatic, cycloaliphatic, or mixed types and may be represented,

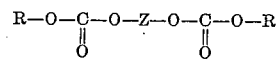

wherein R has the previously accorded significance and Z is a residue of a difunctional hydroxy compound of the aliphatic, aromatic, cycloaliphatic or mixed type. When a chain is formed containing a plurality of groups which may be represented by Z, such chain is a polycarbonate; when only one such Z group is present the carbonate ester is conveniently designated a biscarbonate ester. Such biscarbonate ester may be employed herein as a carbonate ester. Although not a preferred embodiment it is often sufficient to dispense with the dihydroxy compound in the mixture of reactants and employ only catalyst and a biscarbonate ester. Thus, in the practice hereof, any carbonate ester may be employed as a reactant. It has further been found that a biscarbonate ester may be mixed with a catalyst and treated in accord herewith to form polycarbonate and a simple carbonate by-product. The reaction of this invention may be represented by:

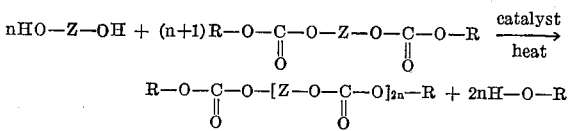

where R and Z have the previously accorded significance.

The mixtures of reactants may be a dry, solid mass of pulverized material at room temperature. In certain cases, notably when one reactant is a liquid, such as didodecyl carbonate, the mixture may be paste or gummy solids. As the temperature is increased these mixtures become liquid or a solution of one or more reactants in another. Usually such mixtures are somewhat viscous. At reaction temperature the mixture becomes progressively more viscous and difficult to mix. This viscous nature is increased further by the removal of volatile reaction products. Consequently, special mechanical means are necessary to move the mixture forward in the reaction zone.

This invention provides an elongated reaction zone through which the mixture of reactants is passed while heating the reaction mixture above the melting range and maintaining said mixture at from 200 to 325° C., preferably from 280 to 325° C. while forwarding it through the reaction zone and withdrawing monohydroxy organic compound intermediate the extremities of the zone whereby to obtain molten polycarbonate resin and extrude said resin therefrom.

The reactants are prepared for use in the practice hereof by weighing batches of carbonate ester, dihydroxy compound and catalyst which are then blended until thoroughly mixed while applying heat to raise the temperature to obtain a fluid mixture. It is essential that the temperature be increased only enough to produce a mixture sufficiently fluid to be easily fed to the reactor shown in FIGURE I. Usually a temperature under 200° C. is adequate although the temperature may be increased to 270° C. if desired. By way of illustration, the fluid mixture may be fed to the reactor by gravity. Alternatively, if desired the temperature may be maintained at a low level in the mixture of reactants and fed by a screw conveyor under moderate pressure to the reactor. The mixture of reactants whether fed at a temperature commensurate with a high degree of fluidity or whether quite viscous, is introduced at port 3 in FIGURE I. Thereafter, the mixture is moved forwardly in the reactor while the temperature is increased to cause reaction to occur. Other means of supplying reaction mixture also may be employed without departing from the invention. For example, a blend of solid and liquid ingredients having a paste-like or dough-like consistency may be prepared in a ribbon blendor or other suitable device and then fed to the reactor. Continuous methods of blending ingredients may also be employed and do not differ from the batch methods of providing reaction mixture insofar as either method suffices to provide a uniform feed. The physical nature of the reactant mixture depends upon the properties of the individual ingredients. By way of illustration, a mixture of an aromatic carbonate ester, such as diphenyl carbonate, with 4,4′-dihydroxydiphenylmethane and a small amount of sodium phenate as catalyst may be prepared as a reaction mixture in a ribbon blendor at 180° C. Such mixture has the consistency of thin varnish, but is slightly opaque. The mixture is fed to the reactor by gravity.

According to a typical practice, this invention entails the sequential transformation of a molten mixture of reactants to a mixture containing polycarbonate resin product and by-product organic monohydroxy compound, viz., phenol. The mixture is maintained in a molten condition while transformation is completed and simultaneously by-product monohydroxy organic compound is removed as a vaporous substance. This may be facilitated by reducing the pressure on the reaction zone. However, it is not desired to reduce the pressure prematurely, i.e., while significant carbonate ester remains in the monomeric form and has a relatively low boiling point at the pressure involved. Thus, it is preferred that the reaction zone be a sequence or plurality of zones in which pressure may be reduced as the reaction mixture traverses the heated zone. After substantially complete reaction and removal of relatively volatile by-product organic monohydroxy compound a mass of plastic or molten polycarbonate resin remains in the extrusion zone. The process, accordingly, is performed by providing a mixture of forwardly moving reactants simultaneously undergoing conversion to polycarbonate product and volatile by-products which are removed to provide an extrudable mass of finished polycarbonate product.

Special apparatus designed to provide zones through which to move reactants and remove low molecular weight, relatively volatile by-product monohydric organic compound or other relatively volatile by-product and ultimately extrude molten polycarbonate facilitates performance of the process. Such apparatus typically includes an elongated chamber, one end of which communicates with a feed means. An extrusion section such as an extrusion die (or nose plate) terminates the other extremity of the chamber. Intermediate the two extremities are means for applying pressure and vacuum (as may be required) and controlling the temperature. Ports are provided for withdrawal of vapors. Within the chamber and providing for the forward movement of the composition are mechanical means such as one or more screws appropriately mounted to impel forwardly liquid polycarbonate compositions from the inlet ends towards and through the extruder. These screws force the liquid polycarbonate composition forwardly, even when it is highly viscous as when polycarbonate is molten. During the volatilization of by-product, these screws work and knead the residual polycarbonate composition in the chamber facilitating its handling and forward movement to the extruder.

As extruded the finished resin may take a variety of forms. Thus, the extrusion die may be of any configuration. Products extruded in spaghetti-like form or as long relatively thin products having triangular, rectangular or circular cross-section areas are the more common. The long string-like extruded materials are preferably chopped, cut or otherwise mechanically subdivided into smaller solids, the maximum size of which is on the order of 1 or 2 inches. This subdivision is ideally performed after air-cooling the extruded material to an ambient temperature. It is also possible to subdivide mechanically the material as it emerges from the extrusion die as by hot chopping.

The performance of this invention may be clearly understood by reference to the drawing which schematically illustrates appropriate apparatus.

In the drawing:

FIGURE 1 is a schematic vertical longitudinal section of the apparatus;

FIGURE 2 is a schematic horizontal section lengthwise of the apparatus;

FIGURE 3 is a vertical cross-section of the apparatus; and

FIGURE 4 is a front view of the nose plate.

The apparatus includes a main barrel 1 which comprises a pair of cylindrical bores 10 and 11 surrounded by heating bath 2 provided with ports 3, 4 and 5 in communication with the barrel. Rather than being a single heating bath, bath 2 may be comprised of a plurality of baths each of which may be individually controlled. Barrel 1 has the configuration illustrated in FIGURE 3. In the bores of barrel 1, worm flights 6 and 7 are mounted in the general relationship illustrated in the figures with the flight of one worm set midway between the flight of the adjacent worm. In the designated points, the worm flights are interrupted by cylindrical pressure blocks 8, 8′, 9 and 9′. These worm flights are driven by motor and gearing arrangement 12.

In performing this invention, a molten mixture of reactants which is generally but not necessarily a clear solution at an elevated temperature is introduced into heating zone A of main barrel 1 through feed port 3. Zone A extends from adjacent feed port 3 up to pressure blocks 8 and 8′. In zone A, this mixture is maintained in the molten condition and is propelled forwardly by the screw flights to pressure blocks 8 and 8′. In operation, the clearance between the inner surface of barrel 1 and these pressure blocks is continuously filled with reaction mixture so that heating zone A is sealed from ensuing zones.

After being appropriately heated in zone A, the reaction mixture, by action of the rotating worms, is forced forwardly past pressure blocks 8 and 8′ into vaporization zone B. Vaporization zone B, as illustrated, comprises that portion of main barrel 1 between facing ends of pressure block pair 8 and 8′ and pressure block pair 9 and 9′. In zone B, monohydroxy organic compound such as phenol or like relatively volatile material is vaporized and vapors are withdrawn through port 4 under reduced pressure. In zone B, up to 95 percent by weight of the monohydroxylic organic compound is removed as the molecular weight and viscosity increase and at a pressure below atmospheric, by way of illustration 50 to 100 millimeters of mercury pressure. These vapors are condensed and utilized separately. For example, when phenol is the recovered monohydroxy compound it may be re-converted to diphenyl carbonate for re-use or it may be disposed of in other processes.

The resulting polycarbonate composition containing lower molecular weight material, i.e., material partially converted according to the equation given as representative of the reaction is moved forwardly by the worms past pressure blocks 9 and 9' (which isolate zone B and zone C) into zone C. In zone C, the polycarbonate composition is depleted by volatilization and removal via port 5 thereof of essentially all the remaining lower molecular weight material under pressures usually below 100 and ideally below 10 millimeters of mercury. Other volatiles which may be present are also removed via port 5, such as degradation products and possibly low molecular weight polycarbonate components or degradation products. The space between pressure blocks 9 and 9' and the inner surface of barrel 1 is, accordingly, filled with polycarbonate to isolate and permit the different pressures prevailing in zones B and C.

Rotation of worms 6 and 7 in zone C continues to move polycarbonate (now in molten state) forward ultimately presenting the composition to an extrusion section and noseplate 13. The molten polycarbonate is thus extruded through nose plate 13 in any convenient configuration.

Zone C and the bores which comprise it terminate as illustrated in FIGURE 2. Thus, one bore and the screw flight therein terminate before the other at 14. In the other bore, the other worm flight extends further as shown, providing an extrusion or pumping zone, ultimately leading to the die holder which widens out. Nose plate 13 is mounted at this widened end of the die holder as illustrated in FIGURE 4. Extrusion is made through holes 17 communicating with extrusion die feed zone 18.

Throughout its movement along main barrel 1, the polycarbonate compositions are at such temperatures that they remain in liquid state. This usually requires heating, especially due to the cooling effect of vaporization. Heat is supplied by oil bath 2, or other heat transfer expedients. Insulation of the apparatus to minimize heat losses is good practice.

The depth of worm flights 6 and 7 (i.e. worm roots) are so designed that the available volume for the polycarbonate composition within main barrel 1 diminishes along the line of polycarbonate flow therethrough to take into account the decrease in volume of the polycarbonate. Thus, in zone A, more volume is available for polycarbonate than in zone C because due to monohydroxy compound removal the composition in the apparatus has decreased. Usually, this difference in available volume is provided by varying the depth of the worm threads, e.g., a larger or smaller diameter worm shaft.

Except for the spaces between the pressure blocks and inner surface, the polycarbonate composition does not fill completely the available volume. This is especially true in zones B and C. This allows vapors to flow through the clearance between the worm threads and inner surface of barrel countercurrently to the flow of polycarbonate and out port 4 or 5. The configuration and interrelationship of the worm flights when the apparatus is functioning properly moves the non-gaseous materials, e.g., the liquid polycarbonate compositions, forwardly without substantial and significant backflow.

Ultimately, after being substantially freed of monohydroxy compound, the polycarbonate is extruded through nose plate 13 ideally in a spaghetti-like shape. Usually, a multiplicity of polycarbonate strands are simultaneously extruded, e.g., the nose plate has a plurality of cricular orifices through which polycarbonate is extruded. As it leaves the nose plate, the polycarbonate is generally at temperatures above its softening point.

In a preferred procedure, the strands of polycarbonate emanating from nose plate 13 are passed along a perforated surface of a cooling table. Air or other inert gaseous coolant (ideally free of dust or other particles) is passed upwardly through the perforations to cool the polycarbonate. In most instances, gaseous coolant at ambient temperatures is sufficiently cool although refrigerated coolant may be used, especially when available contact time may be insufficient to accomplish adequate cooling with warmer gas.

Especially as they emanate from the nose plate and are still quite hot, the strands of polycarbonate are maintained apart, and moved over the cooling table surface usually spaced parallel from one another. These strands, after being cooled, are wound upon a rotating receiving drum at an end of the table remote from the nose plate, or more frequently, pulled forward onto a rotating drum and mechanically subdivided (by cutting) into pellets.

In most instances, the rotating drum draws the strands along the cooling surface. This places some tension upon the strands. While the polycarbonate is still hot enough, as when the strands initially leave the nose plate, the tension stretches (elongates) the strands causing some reduction in the strand cross-section diameter.

In certain cases, the catalyst employed may result in a finished polycarbonate which is slightly cloudy. In many uses of polycarbonate resin, this does no harm and the presence of cloudy material may go undetected, especially where the ultimate use requires addition of coloring matter, etc. Often a catalyst binding material may be added to react with the catalyst to form a material which is less discernible in the polycarbonate. Such materials may be added in zone C.

In carrying out this invention the mixture of reactants which comprises catalyst, carbonate ester, and dihydroxy compound employs, by way of illustration, a biscarbonate ester of a dihydroxy compound such as the bisphenyl carbonate ester of 2,2-bis(4-hydroxyphenyl)propane, a dihydroxy compound such as 2,2-bis(4-hydroxyphenyl) propane, and a small amount of catalyst such as the disodium salt of 2,2-bis(4-hydroxyphenyl)propane. The biscarbonate ester may be replaced by a carbonate ester of the conventional type such as diphenyl carbonate. With a biscarbonate ester of dihydroxy compound, polycarbonates are formed without use of dihydroxy compound. An illustration of this embodiment is the utilization of a reaction mixture of a catalyst such as the disodium salt of 2,2-bis(4-hydroxyphenyl)propane and bisphenyl carbonate of 2,2-bis(4-hydroxyphenyl)propane. When such a reaction mixture as this is employed the reaction may take a slightly different course to eliminate diphenyl carbonate by the action of the catalyst on the biscarbonate ester. While such an embodiment is feasable and may be employed without difficulty, it is generally not economical because of the loss of carbonate fragments to form the volatile diphenyl carbonate. Thus, embodiments are preferred wherein substantially all the carbonate fragments employed in the starting materials are found in the final products.

Catalysts are generally basic metal salts such as hydrides of metals of Groups I, II and III of the Periodic Table; oxides, hydroxides, phenates, and alkoxides of metals of Groups I and II of the Periodic Table and metal alkyls of metals of Groups I, II, III and IVA of the Periodic Table having up to 4 carbon atoms per alkyl group.

Generally, the preferred biscarbonate esters are those prepared from aromatic dihydroxy compound. However, aliphatic carbonate esters such as dihexyl carbonate or aromatic carbonate esters such as diphenyl carbonate can be employed to react with a dihydroxy compound. While it is preferred to employ a dihydroxy aromatic compound, many other types of dihydroxy compound may be employed as indicated hereinafter. Selecting the bisphenyl carbonate ester of 2,2-bis(4-hydroxyphenyl)propane as the carbonate ester and 2,2-bis(4-hydroxyphenyl)propane as the dihydroxy compound, the reaction of this embodiment may be expressed by the following equation:

ported through this zone at a rate such that approximately 20 minutes is required for a given portion to traverse the zone. Phenol is removed as a vaporous substance from the reaction zone and the polycarbonate resin which

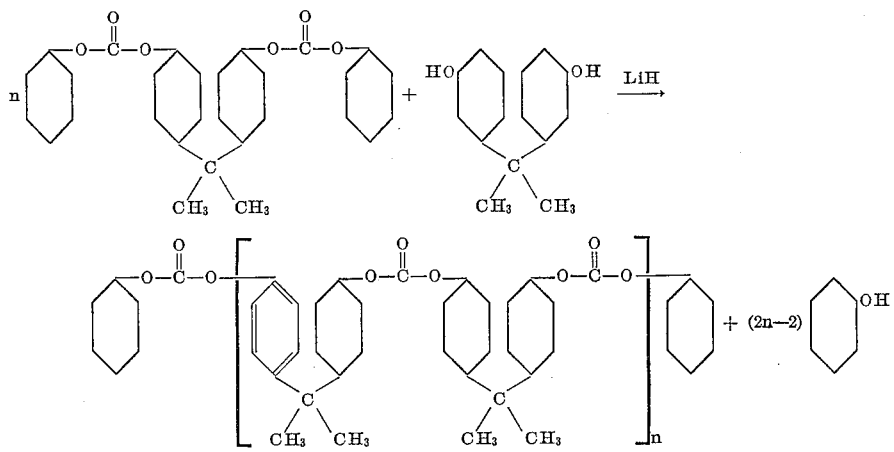

In another embodiment of this invention a mixture of diphenyl carbonate with a molar equivalent of 2,2-bis(4-hydroxyphenyl)propane and a small amount of sodium phenate may be melted together and reacted continuously while the temperature is increased from 230° C. to 290° C. and the pressure in the reaction zone is reduced to 1 millimeter of mercury pressure. The material is transformed is extruded in the form of rods of plastic material.

The embodiments of the invention described above represents different types of reactants from which aromatic polycarbonate resins may be prepared. Typical embodiments are represented by the following equations:

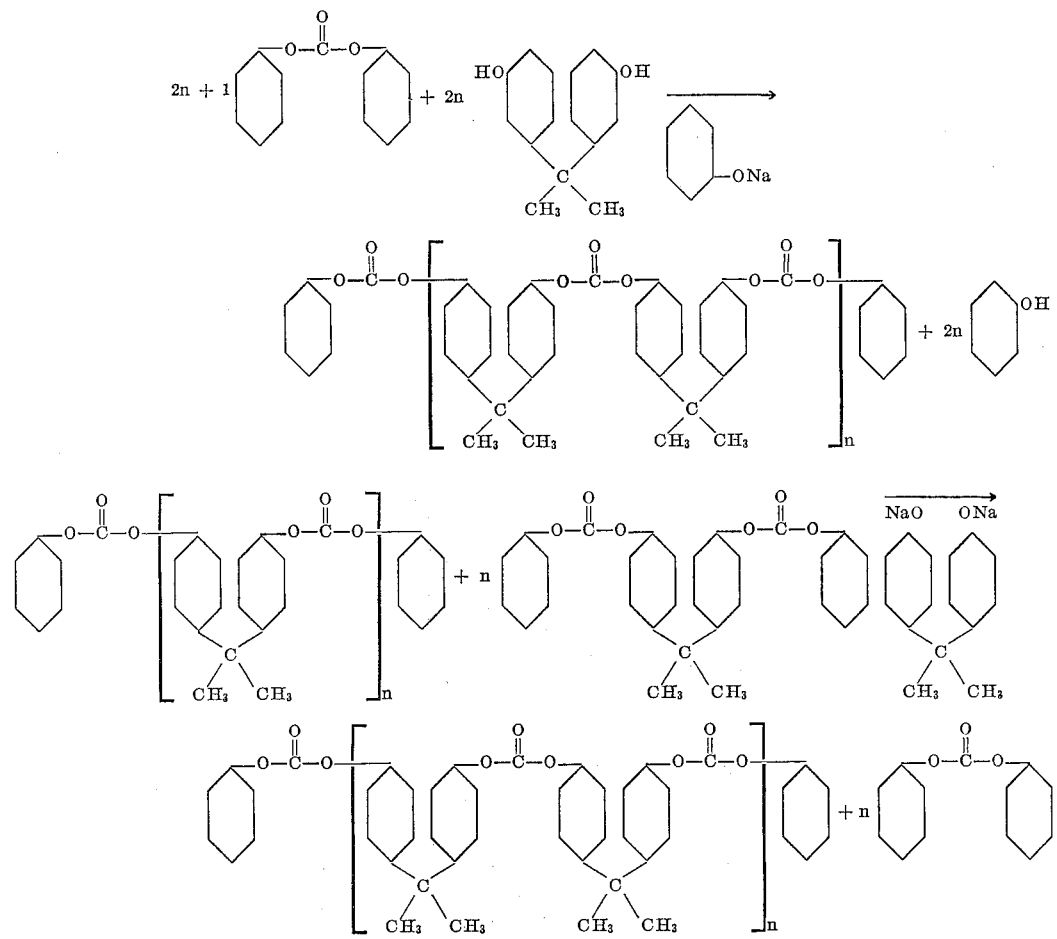

In each of the embodiments given above a wide variety of substitutions may be made to obtain polycarbonate resins having a diversity of properties. In the first embodiment, for example, the bisethyl carbonate ester of 2,2-(4,4'-dihydroxydiphenyl)propane may be substituted for the corresponding bisphenyl carbonate ester. Likewise, a variety of dihydroxy compounds may be substituted for 2,2-(4,4'-dihydroxydiphenyl)propane. One such compound which may be substituted is 1,6-hexanediol. In place of diphenyl carbonate, octyl phenyl carbonate may be employed. However, precautions are to be observed to permit initial condensation to occur before the reaction temperature approaches the normal boiling temperature of the lower boiling compounds or losses will be unduly high. One may also substitute hydroquinone for 2,2-(4,4'-dihydroxydiphenyl)propane. In general these compounds are derived from dihydroxy compounds selected from aromatic, aliphatic or cycloaliphatic dihydroxy compounds. These dihydroxy compounds appear in the final polycarbonate resins as a residue or divalent radical attached to a carbonate group which in turn is attached to another residue of the same or a different dihydroxy residue. When the source of the dihydroxy residue is a bisester or a biscarbonate the dihydroxy residue is attached to a carbonate group which in turn is attached to a monofunctional radical rather than another dihydroxy residue. These monofunctional radicals may be selected from residues of aromatic monohydroxy compounds such as the phenyl radical. They also may be aliphatic or cycloaliphatic, viz., octyl or cyclohexyl. The carbonate precursor may consist of a carbonate ester derived by the linkage of two of these monofunctional alkyl, aryl, or cycloalkyl residues to a carbonate group, viz., dibenzyl carbonate.

It is not always necessary to react a carbonate bearing material with a dihydroxy compound as indicated in the previous embodiments. A biscarbonate ester or low molecular weight polycarbonate may be reacted with itself by the addition of a catalyst to result in higher molecular weight products. As long as the carbonate bearing compound contains carbonate groups in a ratio of greater than one per dihydroxy residue, the compound may be employed for forming a polycarbonate resin by merely heating with a catalyst. This is wasteful of raw materials since a portion of the compound is lost in the process, i.e. all of that above a ratio of one mole of carbonate per mole of dihydroxy residue is lost. Thus, it is preferred to utilize all carbonate present in the original compound by the addition of sufficient dihydroxy compound on a molar basis to result in a ratio of one carbonate group to one dihydroxy residue. It is clear that less than such an amount of dihydroxy compound may result in either a low molecular weight resin or loss of the surplus carbonate.

The temperature at which the interesterification reaction occurs depends to a large degree upon the dihydroxy compound chosen, the carbonate containing compound selected, the particular catalyst employed and its concentration, and also the time in which the reaction is to be completed. Thus, if no catalyst is employed the reactions described above may still be carried out but require a very prolonged reaction period not suitable for a continous reaction. As little as 0.0001 mole of catalyst per mole of dihydroxy compound reduces the reaction time markedly such that temperature ranges of 200 to 325° C. allow the reaction to become complete in a period of from 5 to 30 minutes. Preferred temperatures are from 275 to 325° C. for a period of 5 to 30 minutes. Temperatures above and below this range find utility with certain of the chemical combinations employed. Thus, aliphatic diols such as 1,8-octanediol require a somewhat longer period of time than aromatic diols such as hydraquinone. This prolonged time may be partly offset by employing more active catalyst. A basic metal hydride such as lithium hydride is preferred when the polycarbonate is to be derived by reaction of a carbonate ester or biscarbonate ester with 1,8-octanediol.

The pressure applied to the apparatus is determined by the rapidity with which reaction initially occurs. In the forward stages of the reaction zone the pressure should be relatively high, often atmospheric pressure or even higher to prevent premature volatilization of the volatile reactants such as diphenyl carbonate. After this substance has entered into the condensation the pressure may be reduced to aid in the removal of volatile reacton by-products, viz., phenol. The boiling point of phenol is 182° C. under atmospheric pressure and the last vestiges of this material would be difficult to remove by merely heating the resin mixture. Thus, completion of the reaction is aided by lowering the pressure in successive stages until the lowest practical pressures are obtained. It is often sufficient to reduce the applied pressure to 10 millimeters of mercury pressure. However, clearer products having higher softening points are obtained if the pressure is reduced below this figure, for example, to 0.1 millimeter of mercury pressure.

A variety of mechanical arrangements may be employed at the end of the reaction zone so that the fluid hot liquid resin is extruded in a usable form. The hot reaction zone may be terminated by a device containing a slit to provide a sheet of resin. Alternatively, other mechanical arrangements will permit formations of filaments, films and rods.

While it is not intended to limit the invention to the details of the following examples, such examples are given as illustrative of the manner in which the invention may be performed.

EXAMPLE I

A molten mixture of 468.7 pounds of the bisphenyl carbonate of 2,2 - (4,4' - dihydroxydiphenyl)propane (1 pound-mole) with 227.0 pounds of 2,2-(4,4'-dihydroxydiphenyl)propane (0.995 pound-mole) and 0.272 pounds of the anhydrous disodium salt of 2,2-(4,4'-dihydroxydiphenyl)-propane (0.0001 pound-mole) is fed to an apparatus illustrated in FIGURE 1, and described hereinbefore. To minimize discoloration, a blanket of nitrogen is maintained over the molten feed mixture at approximately 200° C. The 3.5 inch double worm is approximately 100 inches in length and requires 26 pounds of reaction mixture to fill the machine. The mixture is supplied at a constant rate to permit passage of material through the reaction zone and through the nose plate (FIGURE 4) in a period of 30 minutes. The temperature of the reaction zone near the point of entry (port 3, FIGURE 1) is 220° C. (zone A). Thereafter the temperature is raised to 310° C. in the section immediately before extrusion. The rate of extrusion is about 150 pounds per hour. Simultaneously, the pressure is maintained at 10 millimeters of mercury pressure in the reaction zone (FIGURE 1, zone B) and is reduced to 1 millimeter of mercury pressure (FIGURE 1, zone C) prior to extrusion.

In 3 hours, 480 pounds of polycarbonate resin is obtained. Simultaneously, 180 pounds of phenol are removed from the hot zone as a vapor.

EXAMPLE II

The procedure of Example I is repeated except that the mixture is melted at 200° C. prior to introduction into the reaction zone, and the ingredients employed consist of 2.72 pound-moles of 2,2-(4,4'-dihydroxydiphenyl)butane, 0.314 pound-mole of hydroquinone, 1.93 pound-moles of diphenyl carbonate and 0.001 pound-mole of the potassium salt of 2,2-(4,4'-dihydroxydiphenyl)propane. The same time, temperature and pressure conditions as in Example I are employed. Polycarbonate resin is extruded.

EXAMPLE III

The procedure as employed in Example 1 is repeated except that the mixture is melted at 210° C. prior to introduction into the reaction zone and the ingredients employed are 0.5 pound-mole of the bisphenyl carbonate of 2,2-(4,4'-dihydroxydiphenyl)propane, 0.45 pound-mole of 1,1-(4,4'-dihydroxydiphenyl)cyclohexane, 0.05 pound-mole of 1,6-hexane-diol and 0.001 pound-mole of lithium hydride. The rate of passage of the ingredients through the reaction zone is 15 minutes and the temperature prior to extrusion is 315° C. This results in a thermoplastic material having a softening point of 185° C.

In the practice of the invention disclosed herein many compounds are useful. Biscarbonate esters of dihydroxy compounds are reacted with dihydroxy compounds, other biscarbonate esters of dihydroxy compounds or lower polycarbonate resins. These biscarbonate esters in general consist of a biscarbonate ester of a monofunctional hydroxy compound containing up to 18 carbon atoms and preferably more than 4 carbon atoms with a difunctional residue of a dihydroxy compound containing from 2 to 36 carbon atoms. The dihydroxy compound further may be selected from dihydroxy compounds derived from aliphatic residues, aromatic residues, and cycloaliphatic residues. Two or more of these groups may also be combined to form a new difunctional residue useful in this invention by linking these groups with difunctional groups or radicals such as oxygen, sulfur, bis-acyl radicals, sulfone groups, phosphonium groups and bivalent residues of nitrogen compounds, viz., bis-imido. Residues from the following dihydroxy compounds are selected as examples of these types of compounds and are not intended to be exclusive: (4,4'-dihydroxydiphenyl)methane; 1,1-(4,4'-dihydroxydiphenyl)cyclohexane; 2,2 - methylene-bis (4-methyl-6-tertiary-butylphenol); 2,2 - methylene-bis(4-ethyl-6-tertiary-butylphenol); catechol; resorcinol; quinol; orcinol; 1,8-dihydroxynaphthalene; 2,5-dihydroxydiphenyl; bis(p-hydroxyphenyl)sulfone; 3'-chloro - 4,4' - dihydroxydiphenylsulfone; p,p'-dihydroxydiphenyl ether; 4,4'-dihydroxy-3,3'-difluorodiphenyl ether; 1,2-cyclohexanediol; 1,4-cyclohexanediol; 1,2-cyclopentanediol; ethylene glycol; propanediol-1,3; butanediol-1,4; diethylene glycol; tripropylene glycol; 3-butene-1,2-diol; thiodiglycol; metaxylene glycol.

Residues of the above dihydroxy compounds may be employed in polycarbonate resins by mixing two or more of the biscarbonate esters. Also, in place of biscarbonate esters of these residues unsymmetrical carbonate esters may be employed. By way of illustration, phenyl tolyl biscarbonate ester of 2,2-(4,4'-dihydroxydiphenyl)propane may be employed in place of the bisphenyl carbonate ester of 2,2-(4,4'-dihydroxydiphenyl)propane.

Monofunctional hydroxy compounds which may be used for providing such residues in the biscarbonate esters of dihydroxy compounds include alkyl groups derived from straight or branched chain hydrocarbons containing up to 18 carbon atoms and preferably more than 4 carbon atoms; aryl radicals containing from 6 to 18 carbon atoms and cycloalkyl radicals containing from 6 to 18 carbon atoms. The following groups are illustrative and not exclusive: butyl, dodecyl, phenyl, phenanthrenyl, cyclohexyl, decahydronaphthyl.

These same monofunctional radicals and many others may be combined with a carbonate residue to form a simple symmetrical carbonate ester useful in the practice of this invention. Likewise, mixtures of these radicals may be employed in compounds as unsymmetrical carbonate esters, viz., phenyl tolyl carbonate.

While not limited thereto, dihydroxy compounds useful for reacting with biscarbonate esters may be selected from the dihydroxy compounds indicated above to be useful in the formation of these biscarbonate esters.

In addition to the embodiments of the invention disclosed hereinbefore, a portion of the carbonate ester may be replaced by a dicarboxylic acid ester or polyester to provide polymers having modified properties. Usually such embodiments result in softer resins having lower softening temperatures than the polycarbonate resins not so modified. Thus, in the reaction of diphenyl carbonate with 2,2-(4,4'-dihydroxydiphenyl)propane according to the invention described herein, as much as one-half of the diphenyl carbonate may be replaced by a dicarboxylic ester such as diethyl adipate. It is preferred that such substitution be on the order of one-tenth of the diphenyl carbonate to retain the higher softening temperatures characteristic of polycarbonates.

The linear high molecular weight polycarbonates described herein are fusible elastic materials having melting or softening points considerably elevated above those of certain other types of resins of commercial importance and therefore have a high degree of utility. They are soluble in certain organic solvents and can be worked up into films by extrusion or by casting the solution of the polycarbonate. Solutions of these polycarbonates are also useful as lacquer coatings which may be applied by sprays or by pressing. The mechanical and chemical stabilities often may be improved above their original, highly desirable values by incorporating plasticizers to further modify their properties. Asbestos, glass fibers and pigments may be added to modify strength properties, heat properties, opacity and color. Both the modified and unmodified formulations of these polycarbonate resins find exceptional utility in the fields of electrical insulation and coatings, photographic films, as molding resins and in a great variety of other applications.

While the present invention has been described by reference to specific details of certain embodiments, it is not intended that the invention be limited thereto except insofar as appears in the following claims.

We claim:

1. In the method of continuously preparing a polycarbonate resin by reaction of a dihydroxy aromatic organic compound with a monomeric biscarbonate ester of a dihydroxy compound at a temperature of from about 200° C. to about 325° C. and a pressure above 100 millimeters of mercury in a succession of zones, the improvement which comprises
    (a) continuously feeding a fluid mixture of said reactants into a first reaction zone wherein said reactants are converted into a reaction mass composed of the resulting molten polycarbonate resin, low-boiling by-products and unreacted reactants;
    (b) maintaining said reactants and said polycarbonate resin in said reaction mass molten in said first reaction zone and at a pressure of at least 100 millimeters to suppress volatilization of said monomeric biscarbonate ester;
    (c) applying a force to said molten polycarbonate resin and any unreacted reactants therein to move said mass into a second zone which is isolated from said first reaction zone whereby a reduced pressure may be maintained in said second zone and a greater pressure maintained in said first reaction zone during the movement of said reaction mass into said second zone;
    (d) maintaining said second zone at a reduced pressure of below 100 millimeters of mercury to volatilize said low-boiling by-products;
    (e) withdrawing said volatilized low-boiling by-products from said second zone to provide a molten mass of said polycarbonate resin in said second zone;
    (f) applying a force to said mass of molten polycarbonate resin in said second zone to move said polycarbonate resin from said second zone; and
    (g) continuously recovering an extrudable mass of molten polycarbonate resin.

2. The method of claim 1 wherein the polycarbonate resin is formed by reaction of the bisphenyl carbonate of 2,2-(4,4'-dihydroxydiphenyl)propane with 2,2-(4,4'-dihydroxydiphenyl)propane.

3. The method of claim 1 wherein said mass of molten polycarbonate resin moved from said second zone by step (f) is introduced into a third zone that is isolated from said second zone and maintained at a reduced pressure of up to 10 millimeters to volatilize low-boiling compounds remaining in said mass of molten polycarbonate resin and thereafter recovering an extrudable mass of molten polycarbonate resin.

References Cited

UNITED STATES PATENTS

| | | | |
|---|---|---|---|
| 2,735,839 | 2/1956 | Schrenk | 260—95 |
| 3,022,271 | 2/1962 | Darr et al. | 260—47 |
| 3,022,272 | 2/1962 | Schnell et al. | 260—47 |
| 3,153,008 | 11/1964 | Fox | 260—47 X |

FOREIGN PATENTS 1,020,184  11/1957  Germany.

WILLIAM H. SHORT, *Primary Examiner.*

LOUISE P. QUAST, *Examiner.*